(12) United States Patent
Blake et al.

(10) Patent No.: US 7,095,910 B2
(45) Date of Patent: Aug. 22, 2006

(54) WAVELENGTH DIVISION MULTIPLEXING COUPLING DEVICE

(75) Inventors: James Blake, Paradise Valley, AZ (US); Charles Lange, Glendale, AZ (US)

(73) Assignee: Honeywell International, Inc., Morristown, NJ (US)

(*) Notice: Subject to any disclaimer, the term of this patent is extended or adjusted under 35 U.S.C. 154(b) by 227 days.

(21) Appl. No.: 10/355,464

(22) Filed: Jan. 31, 2003

(65) Prior Publication Data

US 2004/0151424 A1    Aug. 5, 2004

(51) Int. Cl.
*G02F 1/295* (2006.01)
*G02B 6/26* (2006.01)
*G02B 6/42* (2006.01)

(52) U.S. Cl. .............................. 385/5; 385/27; 385/31; 385/39; 385/48; 385/50

(58) Field of Classification Search .................. 385/1, 385/4–5, 11–13, 15, 24, 27–31, 37, 42, 48–50, 385/136–137, 144–145; 359/237–238, 240, 359/288, 290–291, 577–579, 589–590
See application file for complete search history.

(56) References Cited

U.S. PATENT DOCUMENTS

| | | | |
|---|---|---|---|
| 5,007,705 A * | 4/1991 | Morey et al. ................. 385/12 |
| 5,042,898 A * | 8/1991 | Morey et al. ................. 385/37 |
| 5,345,519 A * | 9/1994 | Lu ............................... 385/12 |
| 5,416,867 A * | 5/1995 | Thorsten et al. ............... 385/73 |
| 5,555,330 A | 9/1996 | Pan et al. ..................... 385/39 |
| 5,694,503 A * | 12/1997 | Fleming et al. ............... 385/37 |
| 5,796,889 A | 8/1998 | Xu et al. ...................... 385/24 |
| 5,799,120 A | 8/1998 | Kurata et al. ................. 385/45 |
| 5,844,667 A * | 12/1998 | Maron ....................... 356/35.5 |
| 5,982,488 A * | 11/1999 | Shirasaki ..................... 356/519 |
| 5,987,200 A * | 11/1999 | Fleming et al. ............... 385/37 |
| 6,081,641 A * | 6/2000 | Chen ............................ 385/43 |
| 6,144,788 A | 11/2000 | Ang et al. ..................... 385/31 |
| 6,144,789 A * | 11/2000 | Engelberth et al. ........... 385/37 |
| 6,246,048 B1 * | 6/2001 | Ramos et al. ........... 250/227.18 |
| 6,327,405 B1 | 12/2001 | Leyva et al. |
| 6,347,170 B1 | 2/2002 | Zheng .......................... 385/34 |
| 6,349,165 B1 * | 2/2002 | Lock .......................... 385/136 |
| 6,377,727 B1 * | 4/2002 | Dariotis et al. ............... 385/37 |
| 6,385,372 B1 | 5/2002 | Yang ............................ 385/43 |
| 6,411,746 B1 * | 6/2002 | Chamberlain et al. ......... 385/2 |
| 6,422,084 B1 * | 7/2002 | Fernald et al. ................ 73/705 |

(Continued)

FOREIGN PATENT DOCUMENTS

EP    1178336 A1    2/2002

OTHER PUBLICATIONS

Yoffe, G.W. et al., "Passive Temperature-Compensating Package for Optical Fiber Gratings," Applied Optics, Optical Society of America, Washington, US., vol. 34, No. 30, Oct. 20, 1995, pp. 6859-6861.

*Primary Examiner*—Frank G. Font
*Assistant Examiner*—Ryan Lepisto
(74) *Attorney, Agent, or Firm*—Ingrassia Fisher & Lorenz

(57) ABSTRACT

An exemplary WDM coupling device may include optical fibers. The coupling device may also include region(s) having varying coefficients of thermal expansion. During a temperature variation, one or more of the region(s) may alter in size to substantially cancel temperature-dependent changes associated with the WDM coupling device.

6 Claims, 4 Drawing Sheets

U.S. PATENT DOCUMENTS

| | | | |
|---|---|---|---|
| 6,449,293 B1 * | 9/2002 | Pedersen et al. | 372/6 |
| 6,453,092 B1 * | 9/2002 | Trentelman | 385/37 |
| 6,529,671 B1 * | 3/2003 | MacDougall | 385/137 |
| 6,621,957 B1 * | 9/2003 | Sullivan et al. | 385/37 |
| 6,636,667 B1 * | 10/2003 | Wang et al. | 385/37 |
| 2002/0146226 A1 | 10/2002 | Davis et al. | |
| 2003/0026534 A1 * | 2/2003 | Skull et al. | 385/27 |

* cited by examiner

WAVELENGTH DIVISION MULTIPLEXING COUPLING DEVICE

GOVERNMENT RIGHTS

The United States Government has acquired certain rights in this invention pursuant to Contract No. N00030-99-C-0019 awarded by the U.S. Navy.

FIELD OF THE INVENTION

This invention pertains to the field of Wavelength Division Multiplexing (WDM). More specifically, this invention pertains to the field of WDM coupling devices for fiber optics systems.

BACKGROUND OF THE INVENTION

Wavelength Division Multiplexing (WDM) has revolutionized the world of fiber optics by dramatically increasing the bandwidth of optical fiber. WDM enables a number of different wavelengths of light to be transmitted along an optical fiber, thus increasing the number of light signals that may be transmitted at the same time. For example, an ordinary, non-WDM system may only utilize light signals at a single wavelength, such as 700 nm. In contrast, a WDM system may utilize light signals at a variety of different wavelengths, such as 980 nm, 1330 nm, 1480 nm, 1530 nm, 1560 nm and 1650 nm. Thus, WDM systems can enable multiple light signals at different wavelengths to travel separately and simultaneously along an optical fiber.

Additionally, WDM systems often use WDM couplers to separate light signals traveling at different wavelengths along an optical fiber. This is often done at receiving ends of telecommunications systems, where light signals may be separated and channeled along different fibers to various destinations. For example, if an optical fiber carrying two light signals at different wavelengths is passed through a WDM coupler, the light signals may be separated and exit the coupler along two separate optical fibers. This separation may occur due to the fibers' indices of refraction as well as the orientation and location of the fibers with respect to each other. Thus, a WDM coupler may enable multiple light signals that are multiplexed together to be split, allowing a light signal traveling along one fiber to pass uninterrupted to another fiber.

In addition, a properly calibrated WDM coupler may be used to measure the wavelength of a light signal based on the coupler's inherent wavelength dependence. For example, suppose a WDM coupler is designed to send 50% of a 1530 nm wavelength light signal into a first fiber and 50% of the light signal into a second fiber, and the coupler has different splitting ratios for light signals at other wavelengths. Since the wavelength dependent splitting ratio of the coupler is known at 1530 nm, the coupler could be used to test if an incoming light signal has a 1530 nm mean wavelength. Generally, WDM couplers may be used to measure the wavelength of a light signal in applications such as fiber optic gyroscopes, where the wavelength of light exiting a fiber optic coil may be measured to see what deviations have been caused by the coil. These deviations may then be used to correct the output of the gyroscope by compensating for any variation in scale factor caused by a mean wavelength shift.

Unfortunately, however, existing embodiments of WDM couplers have certain limitations. For example, temperature variations can often alter the intrinsic characteristics of a WDM coupler. To illustrate, a temperature variation within a coupler may cause certain materials to expand or contract, which may result in a change in the length of the optical fibers within the coupler. Additionally, the temperature variation may also change the intrinsic effective index of refraction of the optical fibers. Both of these changes may shift the center wavelength in the coupler's splitting spectrum, thus changing its wavelength-dependent splitting ratio.

Therefore, existing WDM couplers may be vulnerable to temperature variations that degrade the performance of the WDM system. Accordingly, it is desirable to have a coupling device that overcomes the above deficiencies associated with the prior art.

SUMMARY

One aspect of an exemplary embodiment is a coupling device for optical fibers. A thermal perturbation may cause a change in a mean splitting wavelength associated with the coupling device. Additionally, the coupling device may include a first region having a first coefficient of thermal expansion, and at least one mounting point for connecting the first region to the optical fibers. Furthermore, the thermal perturbation may cause a change in size of the first region that substantially limits the change in the mean splitting wavelength associated with the coupling device.

In another exemplary aspect, a coupling system may include a coupling device including a first region having a first coefficient of thermal expansion, and a second region having a second coefficient of thermal expansion that is less than the first coefficient of thermal expansion. Further, the coupling device may include a third region having a third coefficient of thermal expansion that is greater than the second coefficient of thermal expansion. The coupling system may also include optical fibers connected to the first region via a first mounting point, and connected to the third region via a second mounting point. Additionally, a temperature increase may cause an expansion of the first region and an expansion of the third region that result in a decrease in a distance between the first mounting point and the second mounting point.

In yet another aspect of an exemplary embodiment, a coupling device may include a first plug having a first coefficient of thermal expansion, a casing having a second coefficient of thermal expansion, and a second plug having a third coefficient of thermal expansion. The second plug may connect to the first plug by the casing. Further, optical fibers may pass through the first plug and the second plug, and the first coefficient of thermal expansion and the third coefficient of thermal expansion may be both greater than the second coefficient of thermal expansion.

DETAILED DESCRIPTION

Typically, a WDM coupling device includes one or more optical fibers passing within the device. These optical fibers may have various intrinsic properties that are temperature-dependent, such as their length and indices of refraction. To illustrate, in a typical WDM coupling device, a temperature increase may cause an expansion of optical fibers while reducing the fibers' indices of refraction. Additionally, changes to intrinsic properties of optical fibers within a coupling device may also alter the wavelength at which the coupling device splits a WDM light signal into multiple light signals (e.g., its mean splitting wavelength).

In an exemplary embodiment, a WDM coupling device may employ temperature-dependent mechanical forces to prevent changes to its mean splitting wavelength. To illustrate, an exemplary WDM coupling device may include a first plug having a first coefficient of thermal expansion (CTE), a casing connected to the first plug and having a second CTE, and a second plug connected to the casing and having a third CTE. CTE may be defined as the fractional increase in a dimension (e.g., length, width) of an object per unit rise in temperature. Additionally, the first plug and the second plug may connect to optical fibers via mounting points, and the region between the mounting points may be defined as a coupling region.

In the present embodiment, the first and third CTEs may be higher than the second CTE. Therefore, for instance, during a temperature increase, the first plug and the second plug may expand more than the casing. Due to the configuration of the coupling device, the expansion of the plugs may cause a mechanical force (e.g., stress, strain) to be applied to the optical fibers that contracts the length of the coupling region. The contraction of the coupling region may substantially limit the temperature-dependent changes to intrinsic properties of the optical fibers. Thus, the exemplary WDM coupling device may retain its intrinsic mean splitting wavelength despite a change in temperature.

Figure 1:
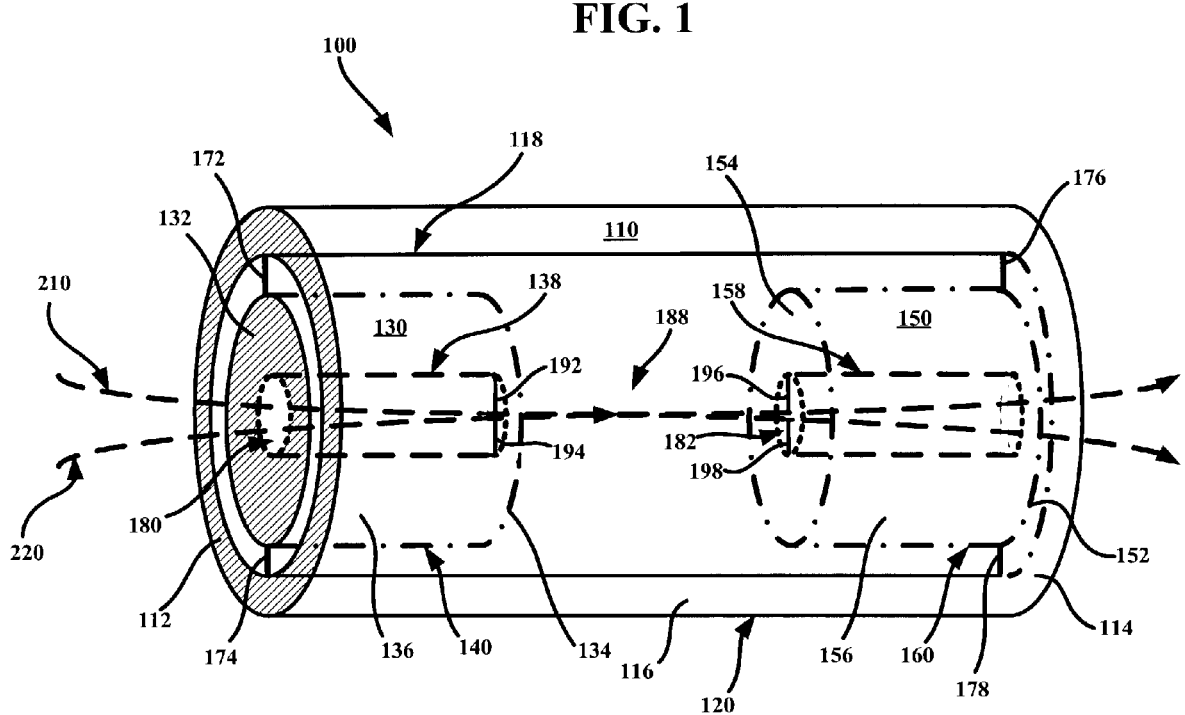
FIG. 1 shows a perspective view of an exemplary WDM coupling device for optical fibers.

Turning now to the drawings, FIG. 1 shows an exemplary WDM coupling device 100 (e.g., WDM coupler). The coupling device 100 preferably includes a first plug 130 and a second plug 150 inserted into a casing 110. The first plug 130 and second plug 150 may further define cores 180, 182, respectively, through which a first optical fiber 210 and second optical fiber 220 may pass. The coupling device 100 may be used for splitting light signals that have been multiplexed together in WDM systems. Exemplary WDM systems where the coupling device 100 may be utilized include fiber optic telecommunications, fiber optic strain and pressure sensors, and fiber optic gyroscopes. It should be understood that the coupling device 100 may be utilized in a wide variety of different systems, and that the systems described here are intended to illustrate, not limit, the spirit and scope of the present embodiment. Further, it should be understood that the relative size of some components in the drawings of the present application may differ from their actual size for ease of reference and clarity. Additionally, for more information on WDM couplers, one can refer to commonly assigned U.S. Pat. No. 6,144,788, the contents of which are incorporated in their entirety herein by reference.

The casing 110 may have a first side 112 and a second side 114 connected to at least one side wall 116. The side wall 116 may further have an inner surface 118 and outer surface 120. Furthermore, the casing 110 may be comprised of any durable material known in the art to have a low CTE, such as stainless steel. In alternate embodiments, different materials with low CTE's may also be used for the casing 110, such as fused quartz and other ceramics, or an alloy of 50% stainless steel and 50% iron. It should be understood that "low CTE" in this exemplary embodiment is preferably defined as having a lower CTE than the CTE in contiguous materials (e.g., the material that comprises the plugs 130, 150). It should be further understood that the term "casing" used in this exemplary embodiment may refer to any region having a low CTE.

The first plug 130 may have a first side 132 and a second side 134 connected to a side wall 136. The side wall 136 may have an inner surface 138 and an outer surface 140. The optical fibers 210, 220 may pass through the core 180 defined by the inner surface 138 and running longitudinally through the center of the first plug 130. Alternatively, the core 180 may be oriented or shaped differently, such as being shaped as a rectangular prism and running at an angle through the side wall 136.

The second plug 150 is preferably the same as the first plug 130. Hence, the second plug 150 may also have a first side 152 and a second side 154 connected to a side wall 156. The side wall 156 on the second plug 150 may also have an inner surface 158 and an outer surface 160. Further, the inner surface 158 of the second plug 150 may define the core 182 through which the optical fibers 210, 220 pass.

Both the first plug 130 and the second plug 150 may be comprised of aluminum, but any material known for having a high CTE may be utilized with the present embodiments. It should be understood that "high CTE" in this exemplary embodiment may be defined as having a higher CTE than the CTE in contiguous materials (e.g., the material that comprises the casing 110). For example, in an alternate embodiment, the plugs 130, 150 may comprise a composite material, such as a ceramic, which may also have a higher CTE than the CTE in the casing 110. It should be further understood that the term "plug" used in this exemplary embodiment may refer to any region having a high CTE.

In the present embodiment, the inner surface 118 of the casing 110 may be connected to the first plug 130 by bonds 172, 174, and the second plug 150 by bonds 176, 178. These bonds may be comprised of an epoxy glue, but it should be understood that any material or mechanism known in the art for connecting different types of metals and/or materials may be used with the present embodiment. For example, welding, shrink fitting, or mechanically clamping the plugs 130, 150 to the casing 110 may additionally or alternatively be performed. Furthermore, the plugs 130, 150 may be proportioned so that they fit snugly when inserted into the casing 110, so that no bonds are utilized.

Additionally, the first plug 130 may connect to the optical fibers 210, 220 by mounting points 192, 194, respectively. Furthermore, the second plug 150 may connect to the optical fibers 210, 220 by mounting points 196, 198, respectively. The mounting points 192–198 may be substantially similar to the bonds 172–178 and may include any type of connecting mechanism (e.g., epoxy bond). Additionally, the region of the optical fibers 210, 220 between the mounting points 192–198 (e.g., the region where the fibers 210, 220 are coupled together) may be referred to as a coupling region 188.

In the present embodiment, the bonds 172–178 may firmly connect the plugs 130, 150 to the casing 110 to prevent the plugs from expanding outward (e.g., toward the first side 112 and the second side 114). Additionally, the mounting points 192–198 may firmly connect the plugs 130, 150 to the optical fibers 210, 220. Thus, for example, during a temperature increase, the plugs 130, 150 may primarily expand inwards, towards the middle of the coupling device 100. This expansion of the plugs 130, 150 may result in a contraction of the coupling region 188. The contraction of the coupling region 188 may substantially prevent changes to the intrinsic properties of the optical fibers that typically occur in response to a temperature change, such as an expansion of the coupling region and a change to the index of refraction of the optical fibers.

In the present embodiment, the optical fibers 210, 220 may comprise glass waveguides designed to carry light signals. Alternatively, the optical fibers 210, 220 may comprise any other material designed to reflect light and transmit light signals (e.g., synthetic plastics). It should be understood that the term "light signal" may include any form of electromagnetic radiation, including visible light and infrared light. Optical fibers are known in the art, and a wide variety of commercial fiber optics products may be utilized for the optical fibers 210, 220. Additionally, the optical fibers 210, 220 may be shaped in a variety of different ways, including as a cylinder or a rectangular prism. It should be further understood that alternate embodiments of the coupling device 100 may utilize other means of transferring light signals, such as through optical waveguides patterned in lithium niobate. Other variations are possible as well.

Figure 2:
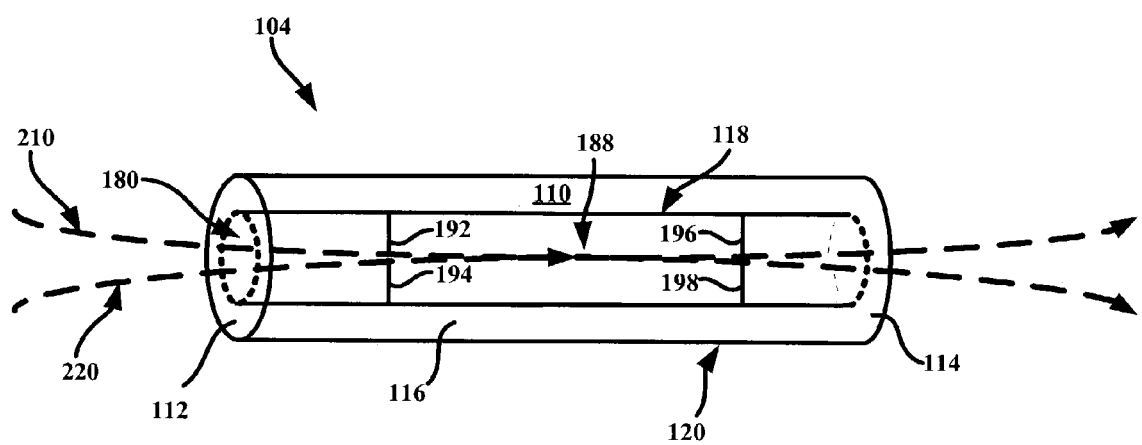
FIG. 2 shows a perspective view of a second exemplary WDM coupling device for optical fibers.

Turning now to FIG. 2, a second exemplary coupling device 104 is shown. This second coupling device 104 is preferably the same as the coupling device 100 shown in FIG. 1, except that the second coupling device 104 does not have either the first plug 130 or the second plug 150. Thus, the inner surface 118 of the casing 110 may define the core 180. In addition, the casing 110 may directly connect to the optical fibers 210, 220 via the mounting points 192–198. In this embodiment, the casing 110 may have a negative CTE, so that the casing 110 contracts in length as temperature increases. Accordingly, as the casing 110 contracts, the coupling region 188 between the mounting points 192–198 may decrease in length, which may prevent changes to intrinsic characteristics of the coupling device (e.g., its mean splitting wavelength). In the present embodiment, the casing 110 may comprise any number of materials that have a negative CTE, including composite materials such as $ZrW_2O_8$.

Figure 3:
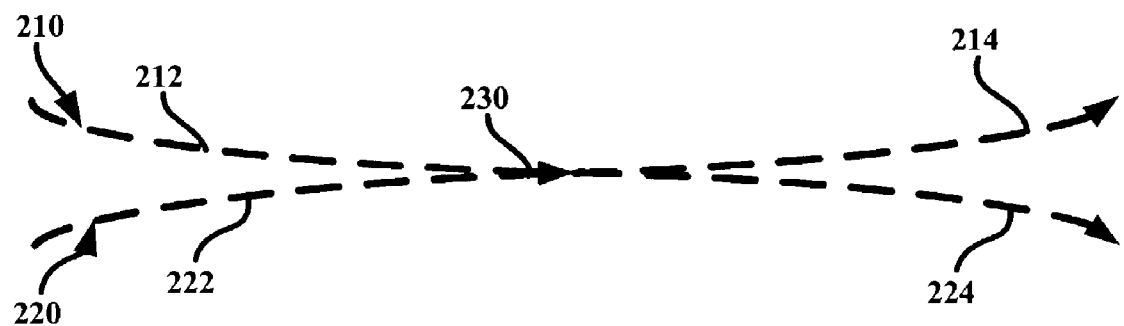
FIG. 3 shows a more detailed view of two optical fibers coupled within the exemplary WDM coupling device of FIG. 1.

Turning now to FIG. 3, the relationship between the exemplary optical fibers 210, 220 is shown in more detail. The optical fiber 210 may have a first part 212 and a second part 214 connected at a tangency point 230. Similarly, the optical fiber 220 may have a first part 222 and a second part 224 connected at the tangency point 230. Light signals traveling along the first fiber 210 may be transferred to the second fiber 220 at the tangency point 230. Similarly, light signals traveling along the second fiber 220 may be transferred to the first fiber 210 at the tangency point 230. It should be understood that although the fibers 210, 220 have been broken into parts for ease of reference, each of the fibers 210, 220 may physically be a single, continuous optical fiber.

Figure 4:
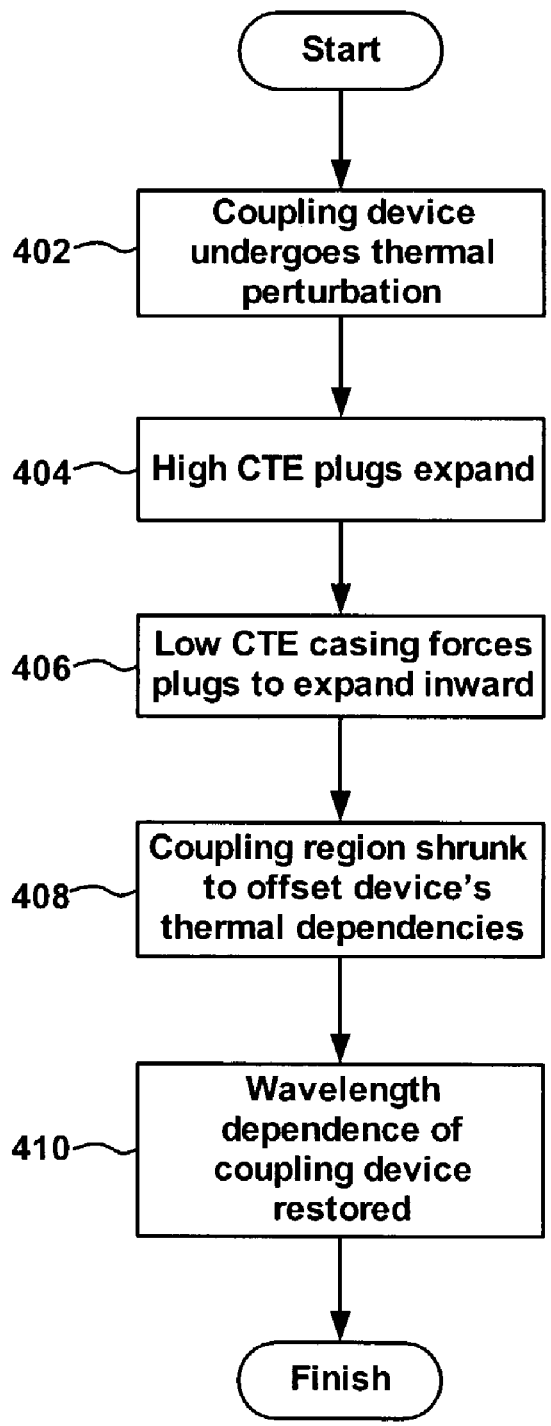
FIG. 4 shows an exemplary method of operation of the WDM coupling device of FIG. 1.

Having described the structure and connectivity of the present embodiments, an exemplary method of operation 400 of the WDM coupling device 100 may now be described, as shown in FIG. 4. In step 402, the WDM coupling device 100 may be exposed to a variation in ambient temperature (e.g., a temperature increase) that creates a thermal perturbation within the coupling device 100. The thermal perturbation may cause changes to intrinsic characteristics of the optical fibers 210, 220, such as by altering the indices of refraction of one or both of the optical fibers 210, 220 or causing the optical fibers 210, 220 to expand.

Additionally, these changes to intrinsic characteristics of the optical fibers 210, 220 may also shift the intrinsic mean splitting wavelength of the WDM coupling device 100 and thus alter its splitting ratio. Therefore, WDM light signals that travel along the optical fibers 210, 220 may be split or refracted differently after the temperature change than before.

In step 404, the plugs 130, 150 (which can have a high CTE) may change size in the radial and/or longitudinal directions due to the temperature variation. In the present embodiment, the plugs 130, 150 may expand if the temperature increases and contract if the temperature decreases, though this may vary in alternate embodiments.

In step 406, the casing 110 may resist changing its size in response to the temperature variation due to its lower CTE. Thus, the casing 110 may undergo a smaller change in its radius and/or physical length as compared to the plugs 130, 150. To illustrate, in an exemplary embodiment, if the temperature variation is a temperature increase, the plugs 130, 150 may expand more than the casing 110, and the casing 110 may therefore direct expansion of the plugs 130,150 inward toward the center of the coupling device 100.

In step 408, as mentioned previously, the expansion of the plugs 130, 150 during a temperature increase may cause a mechanical force (e.g., stress, strain) to be applied to the optical fibers 210, 220 that contracts the coupling region 188. The contraction of the coupling region 188 may counteract the intrinsic change(s) to the optical fibers 210, 220 that were induced by the thermal perturbation. Alternatively, during a decrease in ambient temperature, the plugs 130, 150 may decrease in size, thus stretching the coupling region 188 in order to offset the changes induced by the thermal perturbation.

In step 410, the original wavelength dependency of the coupling device 100 may be substantially restored, and the coupling device 100 may substantially maintain its original mean splitting wavelength.

It should be understood that the present method 400 may also be applied to alternate exemplary coupling devices, such as the coupling device 104. Furthermore, in alternate embodiments, more than two optical fibers may be utilized, and light may be transferred between the fibers in a variety of different manners.

The exemplary coupling devices 100, 104 disclosed in the present application may have a number of advantages. The coupling devices 100, 104 may use temperature-dependent mechanical forces to offset temperature-dependent changes to intrinsic characteristics of the coupling devices. Thus, the present WDM coupling devices 100, 104 may be less sensitive to temperature changes and may split WDM signals more accurately. Additionally, the coupling devices 100, 104 may be more cost-effective to implement, since the improved accuracy of the coupling devices 100, 104 may outweigh any minimal additional cost.

It should be understood that a wide variety of changes and modifications may be made to the embodiments of the WDM coupling device 100 described above. For example, in an alternate embodiment, more than two optical fibers 210, 220 may be coupled together by the coupling device 100. Furthermore, in alternate embodiments, the casing 110, plugs 130, 150, core 180 and/or optical fibers 210, 220 may each have a different shape, such as a rectangular prism.

What is claimed is:

1. A coupling device comprising:
a casing having a first end, a second end, and an inner surface that defines a bore that extends therethrough between the first and second ends, the casing formed of a material having a first coefficient of thermal expansion;

a first plug having an inner surface that defines a core that extends therethrough, the first plug disposed within the casing bore and coupled to the casing inner surface, the first plug having a second coefficient of thermal expansion, the second coefficient of thermal expansion greater than the first coefficient of thermal expansion;

a second plug having an inner surface that defines a core that extends therethrough, the second plug disposed within the casing bore and coupled to the casing inner surface, the second plug spaced apart from the first plug to define a coupling region, the second plug having a third coefficient of thermal expansion, the third coefficient of thermal expansion greater than the first coefficient of thermal expansion; and a plurality of optical fibers extending through the casing bore, the first plug core and the second plug core, at least one of the optical fibers coupled to the first plug at a first mounting point, at least one of the optical fibers coupled to the second plug at a second mounting point, and wherein the first and second plugs are coupled to the casing inner surface such that a temperature increase inhibits expansion of the first plug and the second plug toward the first end and the second end, respectively, and allows expansion of the first plug and the second plug toward the second end and the first end, respectively, to thereby decrease a distance between the first mounting point and the second mounting point, and wherein a first one of the optical fibers is configured to transport an optical signal comprising two or more light signals, each of the light signals having a fixed wavelength, and wherein a second one of the optical fibers is configured to receive at least one of the two or more light signals from the first one of the optical fibers.

2. The coupling device of claim 1, wherein the casing retains its original size in response to the temperature increase.

3. The coupling device of claim 1, wherein the coupling device splits a light signal traveling along at least one of the optical fibers into multiple light signals having different wavelengths.

4. The coupling device of claim 1, wherein the first plug and the second plug comprise aluminum, and the casing comprises stainless steel.

5. The coupling device of claim 1, wherein the second coefficient of thermal expansion equals the third coefficient of thermal expansion.

6. The coupling device of claim 1 wherein the casing comprises $ZrW_2O_8$.

* * * * *